US008077619B2

(12) United States Patent
Monette et al.

(10) Patent No.: US 8,077,619 B2
(45) Date of Patent: Dec. 13, 2011

(54) METHOD FOR AGGREGATING DATA TRAFFIC OVER AN ACCESS DOMAIN AND NODES THEREFOR

(75) Inventors: Sylvain Monette, Blainville (CA); Mathieu Giguere, Pincourt (CA); Martin Julien, Laval (CA); Benoit Tremblay, Laval (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1484 days.

(21) Appl. No.: 11/316,934

(22) Filed: Dec. 27, 2005

(65) Prior Publication Data

US 2006/0182123 A1 Aug. 17, 2006

Related U.S. Application Data

(60) Provisional application No. 60/651,971, filed on Feb. 14, 2005, provisional application No. 60/674,307, filed on Apr. 25, 2005.

(51) Int. Cl.
*H04L 12/26* (2006.01)
(52) U.S. Cl. ............... 370/235; 370/395.53; 370/401
(58) Field of Classification Search .......... 370/230, 370/235, 351, 352, 355, 395.53, 401
See application file for complete search history.

(56) References Cited

U.S. PATENT DOCUMENTS

| 2003/0055878 | A1 | 3/2003 | Fletcher et al. ............... 709/203 |
| 2003/0189898 | A1* | 10/2003 | Frick et al. ..................... 370/227 |
| 2004/0003032 | A1 | 1/2004 | Ma et al. ........................ 709/203 |
| 2005/0138171 | A1* | 6/2005 | Slaight ........................... 709/225 |
| 2005/0152271 | A1* | 7/2005 | Rindborg et al. ............. 370/230 |

FOREIGN PATENT DOCUMENTS

| WO | WO 03/067823 A1 * | 8/2003 |
| WO | WO 2004/102890 | 11/2004 |

OTHER PUBLICATIONS

PCT Search Report dated Sep. 7, 2006 from corresponding application PCT/IB2006/050309.

* cited by examiner

*Primary Examiner* — Chirag Shah
*Assistant Examiner* — Jay P Patel

(57) ABSTRACT

A method and nodes for aggregating data traffic over an access domain between service providers and user domains. An access edge node is introduced in the access domain between service providers and user domains. The access edge node hosts service agents, each service agent controlling a Virtual Local Area Network (VLAN) over the access domain for one of the service providers. The access edge node verifies whether a service agent, corresponding to the service provider identified in a received service request, exists. If so, the user domain is added to the VLAN corresponding to the requested service provider by creating a service binding at the access edge node. An access node providing access to the access domain to the user domain is informed of the service binding. Data traffic between the user domain and the identified service provider is aggregated over the access domain according to the created service binding.

18 Claims, 9 Drawing Sheets

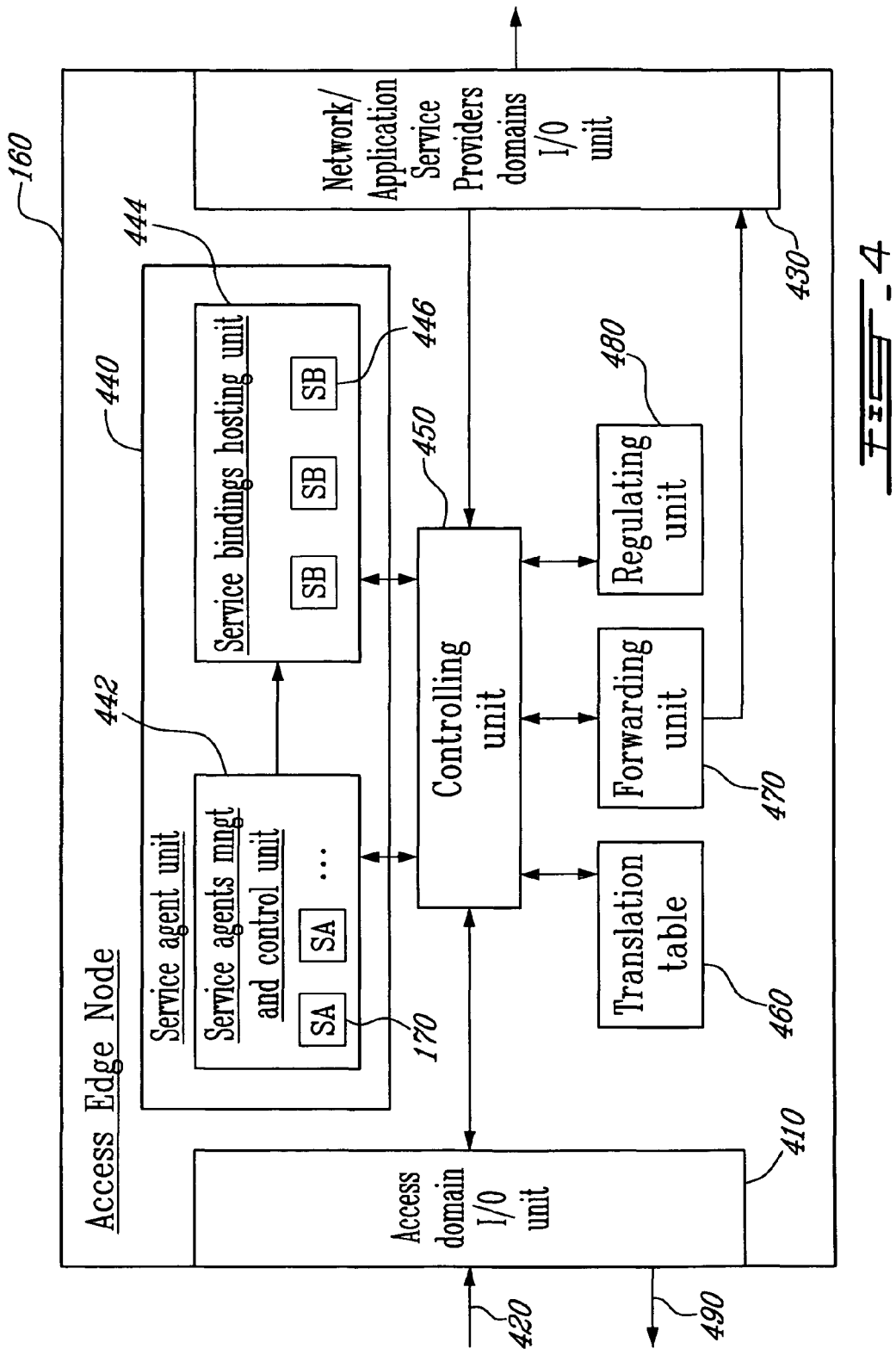

Service Agents mngt and Control unit 442

| Service Agent | Service Type | Properties | Service Provider D Port |
|---|---|---|---|
| SA | Service A | $Bw_1$, $QoS_2$, $IP_{v4}$ | Port XXY |
| $SA_1$ | Service B | $QoS_1$, $Bw_2$ | Port XYZ |
| $SA_2$ | Service A | $Bw_2$, $QoS_2$, $IP_{v6}$ | Port XXY |
| ... | ... | ... | ... |

Service Bindings Hosting Unit

| | Service Type | User MAC info | User port on access node | Local network context | Access Node MAC |
|---|---|---|---|---|---|
| $SA_{1D}$ | | | | | |
| $SA_1$ | Service A | MAC add 1 | Port ABC | Local identifier X | $AN_1$ MAC |
| $SA_2$ | Service C | MAC add 2 | Port AAB | Local identifier Y | $AN_1$ MAC |
| $SA_3$ | Service B | MAC add 3 | Port ABA | Local identifier Z | $AN_2$ MAC |
| ... | ... | ... | ... | ... | ... |

Transport Primitives

FIG-5B

METHOD FOR AGGREGATING DATA TRAFFIC OVER AN ACCESS DOMAIN AND NODES THEREFOR

PRIORITY STATEMENT UNDER 35 U.S.C. S.119 (e) & 37 C.F.R. S.1.78

This non-provisional patent application claims priority based upon the prior U.S. provisional patent applications entitled "Poly project" and "Access node-edge node complex protocol (AEP)", having respective application No. 60/651,971, filed Feb. 14, 2005, in the names of Sylvain Monette, Mathieu Giguere, Martin Julien and Benoit Tremblay, and application No. 60/674,307, filed Apr. 25, 2005 in the names of Sylvain Monette, Mathieu Giguere, Martin Julien and Benoit Tremblay.

BACKGROUND OF THE INVENTION

1. Field of the Invention

The present invention relates to a method for aggregating data traffic over an access domain, and to an access node and an access edge node for aggregating data traffic in accordance with the present method.

2. Description of the Related Art

Recent years have seen the explosion of Internet Protocol (IP) networks. Initially developed to allow universities and researchers to communicate and cooperate in research projects, it has grown into networks offered at a mass-market level. Nowadays, it is normal for households to have a connection to an IP network to surf the world-wide-web, play interactive games, carry Voice over IP, download documents and softwares, make electronic business transactions, etc.

Reference is now made to FIG. 1, which represents a prior art example of an IP network 100. Typically, an IP network is composed of an access domain 115, network service provider domains 140 and application service provider domains 150. The access domain 115 includes Access Nodes (AN) 120 and an access network 130, such as an IP network. The ANs 120 are access providers, which can offer access to the IP network 130 to user domains 110. The user domains 110 include for example User Devices (UDs) (such as computers, mobile phones, personal digital assistants, etc.), Local Area Networks (LANs) and Wireless-LANs (W-LANs). The user domains communicate with the ANs over various possible technologies. Amongst those technologies can be found dial-up connections and Asymmetric Distribution Subscriber Line connections over telephone lines, cable modems connecting over television cable networks, or wireless communications. The access network 130 is composed of a group of independent switches and routers, which task is to switch/route incoming data traffic based on a destination address embedded therein. As for the network service provider domains 140, they may correspond for example to Voice over IP services, while the application service provider domains 150 may correspond to electronic banking and electronic business transactions.

Though FIG. 1 depicts three user domains, two Access Nodes, two service provider domains and two application service domains, IP networks 100 typically include several thousands of user domains, tenths of Access Nodes, hundreds of network service provider domains and application service provider domains. As to the access network 130, it is common to encounter networks including hundreds of switches and/or routers. It is thus understood that FIG. 1 depicts a highly simplified IP network 100 for clarity purposes.

To ensure a coordinated exchange of data traffic and messages over such IP networks, the IP protocol was developed in the early 1970's. The IP version 4 (IPv4) is used by a majority of currently deployed IP networks. IPv4 provisions for an addressing scheme using 32 bits, which results in a 4, 294, 967, 296 possible addresses, where each address is unique, and directly identifies one device. In the case of IP networks 100 such as the one shown on FIG. 1, it is commonly known that such network rely on Ethernet-based data link to provide fast and simple transfer of data traffic and messages throughout the IP network 100.

But with the increasing number of devices communicating over the IP networks, and some inherent limitations of IPv4, the IP community has seen the need for a new revision of IP: IP version 6 (IPv6). That new version relies on an addressing scheme using 128 bits, which provides for a much wider number of possible addresses.

Though IPv6 allows for a much greater number of IP addresses, and also addresses some deficiencies found in IPv4, both IPv4 and IPv6 are "best-effort" protocols. "Best-effort" means that a network delivers data traffic without making particular effort to meet higher or particular demands on a quality of service required for those types of data traffic. This might be sufficient for some network service providers 140 and application service providers 150, but unfortunately it proves to be insufficient for others. Thus, some network service providers 140 and application service providers 150 cannot easily and fluidly offer their services over IP networks 100.

To overcome this problem, the MultiProtocol Label Switching (MPLS) is being used over IP networks. MPLS relies on protocols such as ReSerVation Protocol (RSVP) for reserving a path, with a specific quality of service, over the IP network 100. RSVP initially creates a path through a series of routers. To create the path, each router adds an entry to its MPLS table. That entry indicates for data traffic arriving at a specific entry port and having a predetermined label, a corresponding output port and label to be used. By creating such reserved paths in the IP network 100, it makes it possible to carry data traffic for a larger spectrum of network service providers 140 and application service providers 150.

However, with the increasing number of network service providers 140 and application service providers 150 requiring higher quality of service than "best effort", along with an expansion of the number User Domains 110 and Access Nodes 120 required to allow these User Domains 110 the possibility to use the access network 130, MPLS does not prove to be a good option.

The initial principle at the basis of IP networks is to rely on routers, which perform as few and as little operations as possible before routing incoming data traffic towards their final destination. Also, it is a widely recognized concept that "best effort" networks are a trade-off between quality of service and quantity of data traffic. An increased quality of service, for the same number of routers results in a lower quantity of data traffic being transported on those routers. IP networks have not been designed bearing in mind higher level of quality of service. Thus, by creating reserved paths for higher quality of service of data traffic over IP networks, a direct consequence is a reduced quantity of data traffic over those IP networks. In addition, such reserved paths needed for MPLS result in consuming more routing effort in each of the router on the reserved paths. Such routing effort is not significant when only a few reserved paths are open simultaneously, but with the current development of services applications requiring more than "best effort" quality of service, it is possible to envision that thousands of reserved paths will be required simultaneously over the IP networks. Maintaining and routing data traffic with so many reserved paths will become more cumbersome for routers, thus also resulting in slowing routing capabilities of the affected routers. Therefore, the current use of MPLS over IP networks for improving quality of service is resulting in less data traffic being exchanged, and in slower data traffic. Such impacts are not acceptable, as they directly affect all data traffic that is not part of the reserved paths.

There is currently no known solution to the problems associated with the explosion of the number of user devices and of service providers offering services on IP networks. Furthermore, no long-term solution has been identified to allow a tangible and non-destructive solution to the need of increased QoS for certain services and applications.

Accordingly, it should be readily appreciated that in order to overcome the deficiencies and shortcomings of the existing solutions, it would be advantageous to have a method and nodes for efficiently allowing thousands of network service provider domains and application service provider domains to communicate over an access network with user domains. It would also be another advantage to have a method and nodes that allow for a coordinated usage of the access network while providing various levels of quality of service. The present invention provides such a method and nodes.

SUMMARY OF THE INVENTION

The present invention efficiently allows thousands of network service provider domains and application service provider domains to communicate over an access domain with user domains by aggregating data traffic. The method and nodes for aggregating data traffic of the present invention rely on a coordinated usage of the access domain and the concept of service bindings for providing various levels of quality of service.

For doing so, the present invention is concretized, in one aspect, in an access edge node for aggregating data traffic over an access domain carrying data traffic between user domains and service provider domains. The access edge node of the present invention includes a service agent unit, a service bindings unit, an input/output unit, and a controlling unit. The service agent unit hosts service agents. Each of the service agents corresponds to one of the service provider domain, and maintains therefor a Virtual Local Area Network over the access domain. The service bindings unit hosts existing service binding information. Each of the service bindings includes identity of one of the service agents, user domain information and access domain transport primitives. The input/output unit communicates with the service provider domains, and with access nodes providing access to the access domain for the user domains. The input/output unit receives service request related messages identifying one of the service provider domain and one of the user domain. The controlling unit determines, upon receipt of the service request related message at the input/output unit, whether one of the service agents corresponds to the service provider domains identified therein. If one of the service agent corresponds to the service provider domain identified in the service request related message, the controlling unit creates a corresponding service binding in the service bindings unit and informs the access node serving the user domain identified in the service request message to send data traffic for the identified user domain to the identified service provider domain in accordance with the created service binding.

In one aspect of the invention, the creating of a service binding in the service bindings unit includes adding the user domain to the VLAN corresponding to the requested service provider by adding in the service bindings unit an entry with the identity of the service agents corresponding to the requested service provider, user domain information and access domain transport primitives therebetween.

In another aspect, the invention relates to a method for performing aggregation of data traffic over an access domain carrying data traffic between a plurality of service providers and user domains. The method comprises a step for establishing a plurality of service agents in an access edge node. Each of the service agents correspond to a Virtual Local Area Network over the access domain for one of the service provider domains. Upon receipt at the access edge node of a service request related message, the service request related message identifying one of the service provider domain and one of the user domain, a step of determining whether one of the established service agents corresponds to the required service provider domain, and if so creating a service binding at the access edge node for the received service request related message. The service binding includes identity of the corresponding service agent, information on the user domain and transport primitives of the access domain. The present method further proceeds with informing an access node responsible for providing access to the identified user domains to the access domain of the created service binding, and to aggregate data traffic received from the identified user domain for the identified service provider in accordance with the created service binding.

In another aspect, the present invention relates to an access node for aggregating data traffic over an access domain carrying data traffic between user domains and service provider domains. The access node includes an input/output unit, an aggregation unit and a controlling unit. The input/output unit receives data traffic from the user domains, and forwards data traffic received from the user domains over the access domain. The aggregation unit stores information on existing service bindings over the access domain, such as an identification of the service binding, identity of a user domain with an identity of a corresponding service provider domain. The controlling unit determines, upon receipt of data traffic from one of the user domains, whether that data traffic corresponds to one of the existing service bindings. That determination is performed by comparing user domain and service provider domain identities in the aggregation unit. If the user domain and service provider domain identities correspond to one of the existing service binding, the controlling unit informs the input/output unit to aggregate that received data traffic over the access domain in accordance with the identified service binding.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 4 is a schematic representation of an access edge node in accordance with the teachings of the present invention;

FIG. 5a is an exemplary tabular representation of the content of a service agents management and control unit in accordance with the present invention;

FIG. 5b is an exemplary tabular representation of the content of a service bindings hosting unit in accordance with the teachings of the present invention;

DETAILED DESCRIPTION OF THE PREFERRED EMBODIMENTS

Figure 1:
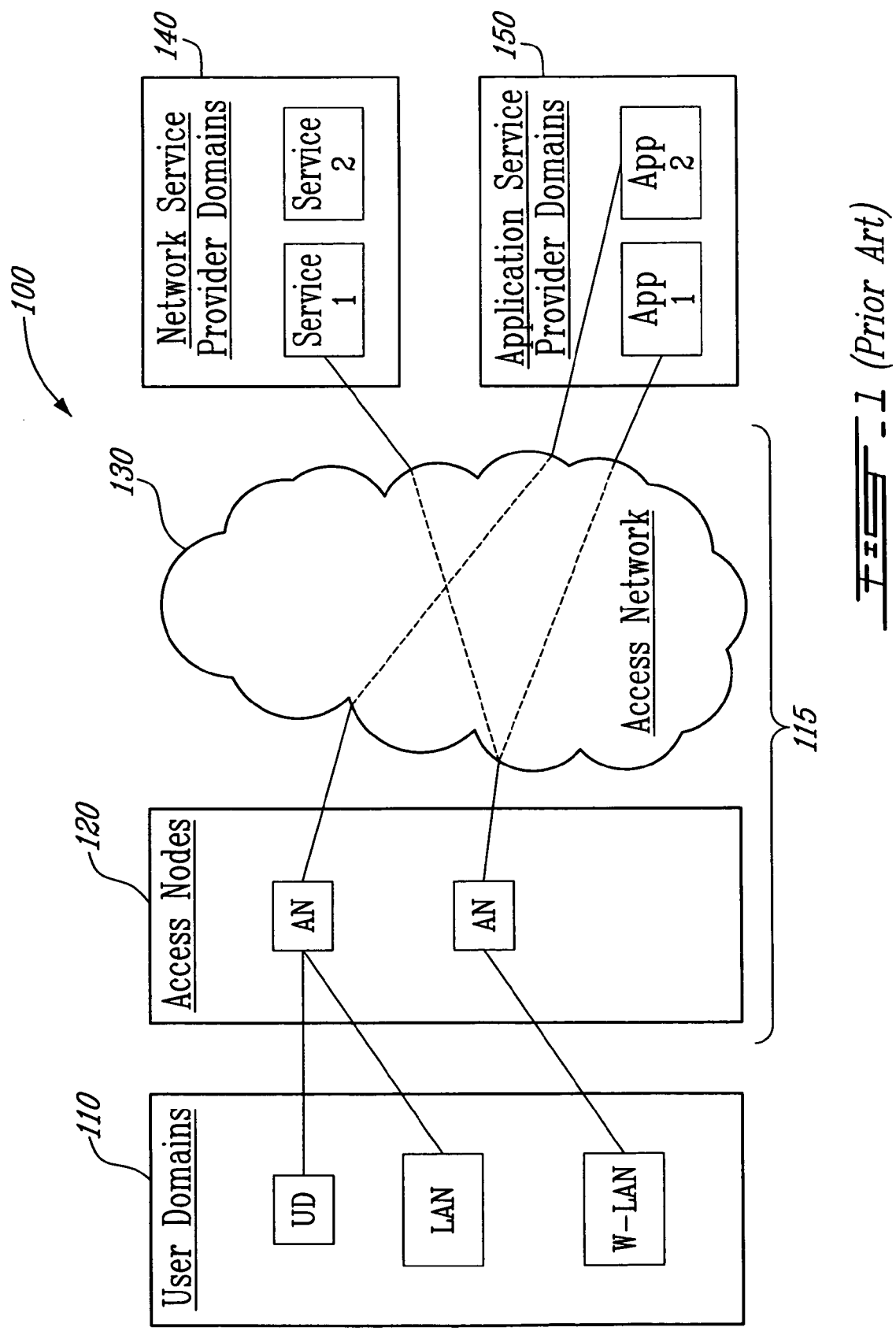
FIG. 1 is a prior art example of an IP network.

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

The present invention provides a method and nodes for efficiently aggregating data traffic originating/directed from/ to multiple user domains in communication with service provider domains. For doing so, an access edge node is introduced within the access domain, between the user domains and the service provider domains. The access edge node includes a service agent unit, which manages and controls service agents. Each of the service agents corresponds on one hand to one of the service provider domain, and on the other hand manages and controls therefor a Virtual Local Area Network (VLAN) over the access domain. Whenever a user domain wishes to communicate with a selected one of the service provider domains, a service request related message is to the access edge node. The service request related message includes information identifying one of the service provider domain and one of the user domain. The access edge node determines whether one of the service agent correspond to the service provider domain identified in the service request related message, and if so creates a service binding for the received service request related message. The service binding identifies one of the service agents, user domain information and access domain transport primitives. Then, an access node serving the requesting user domain is informed of the creation of the service binding, and aggregation of data traffic related to the service request related message is performed over the access domain in accordance with the created service binding. The following paragraphs will provide a more detailed explanation of how service agents, service bindings, and the access edge node and access node are woven together so as to aggregate data traffic over the access domain.

The expression "data traffic" is used throughout the present specification and relates to messages and information transferred over a data network.

Figure 2:
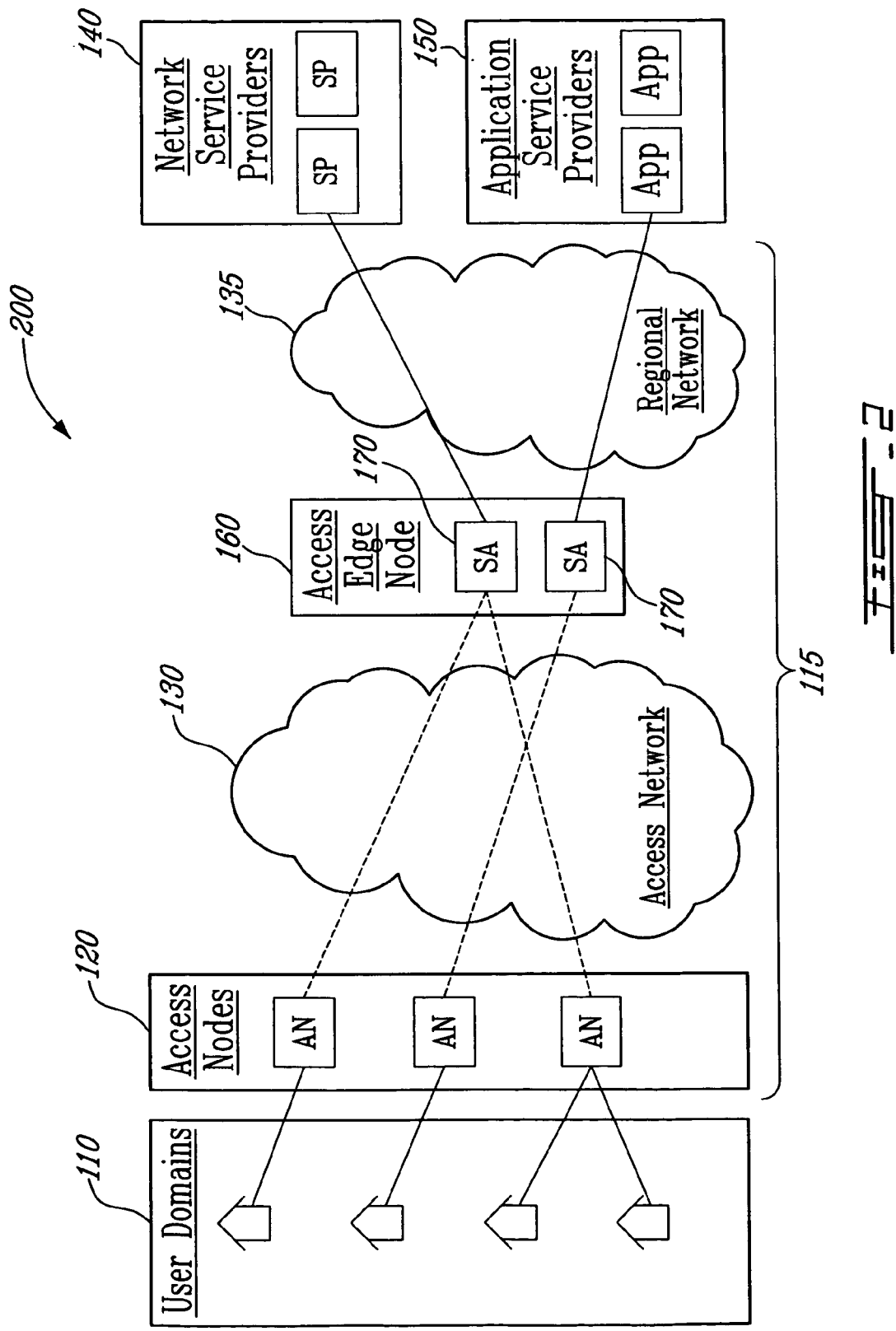
FIG. 2 is a schematic exemplifying a network in which the present invention has been incorporated.

To understand the present invention and its inventive mechanisms, reference is now made to FIG. 2, which is a schematic exemplifying a network 200 in which the present invention has been incorporated. The schematic representation of the network 200 has been simplified for clarity purposes, and the various elements depicted have been grouped by similar functions rather than graphically representing geographical network entities. However, each group of similar functions would typically correspond to a multitude of physical network entities performing those specific functions, geographically scattered throughout the network 200. The schematic representation of the network 200 includes user domains 110, an access domain 115 (including: access nodes 120, an access network 130, an access edge node 160 and a regional network 135), network service providers 140, and application servers 150. An exhaustive description and examples for each of those elements will be provided in the following paragraphs, with continued reference to FIG. 2.

The network 200 corresponds to one or multiple data networks communicating together. Thus, the network 200 could be operated by one or multiple operators. As data networks are usually supported by a number of different operational entities and/or organizations, it is necessary to define how those entities and organizations can successfully communicate. For this reason, data networks are usually explained and detailed using the Open System Interconnection (OSI) model. The OSI model defines a networking framework for implementing protocols in seven layers. Those seven layers are in the respective order: 1) Physical layer; 2) Data Link Layer; 3) Network Layer; 4) Transport Layer; 5) Session Layer; 6) Presentation Layer and 7) Application Layer. Each layer corresponds to an aspect to be considered and actions to be undertaken when performing data transmission over a data network. Using the OSI model to describe the network 200 of the present invention, it is possible to layer some of the various protocols used and/or supported by the network of the present invention as follows:

- Layer 2: Ethernet, Asynchronous Transfer Mode;
- Layer 3: Internet Protocol (IP) versions 4 and 6,
- Layers 4 and 5: Transmission Control Protocol (TCP) and User Datagram Protocol (UDP); and
- Layers 6 and 7: various presentations and applications protocols currently existing and to come.

It should be understood that the above list of protocols is provided for exemplary purposes, rather than for limiting the protocols supported by the present invention.

Turning now to the access domain 115, it is possible to summarize its function as a means to provide end-to-end access between the user domains 110 and the network service providers 140 and application service providers 150. The access domain includes the access nodes 120, the access network 130, the regional network 135 and the access edge node 160. Thus, the access domain 115 is not an entity per se; it is rather an aggregation of components, which when interconnected together either directly or indirectly, act as a domain for providing access, hence its name "access domain". It should thus be clear that the current representation of the access domain 115 including only one access node 120, one access network 130, one access edge node 160 and one regional network 135 does not mean that such entities are found single in the access domain, but rather that for sake of clarity only one such entity is represented. The following paragraphs explain in greater details the various components of the access domain.

The access nodes 120, which also include access gateways (not shown), represent the first component of the access domain 115. The access nodes 120 typically refer to access providers, which allow user domains 110 accesses to the access network 130, upon, for example, subscription or pay-per-usage basis. Such access can be made possible using various mediums and technologies. Amongst the possible mediums are cable, landline phone, and wireless phone. As to the possible technologies, Integrated Services Digital Network (ISDN) and Asymmetric Digital Subscriber Line (ADSL), Worldwide Interoperability for Microwave Access (WiMax) are examples of possible technologies. However, it should be noted that the present invention is not limited to those mediums or technologies. Also, even though only three access nodes have been depicted, it should be noted that the network 200 potentially includes hundreds or thousands of access nodes.

The access domain also includes the access network 130 and the regional network 135 which will be discussed together. The primary function of the access network 130 and the regional network 135 is to provide end-to-end, and independent transport between the access nodes 120 and the network service providers 140 and the application service providers 150. The access network 130 and regional network 135 are networks capable of tasks such as: aggregation, switching and routing downstream and upstream data traffic. The access network 130 is preferably capable of using Ethernet, or other similar protocols, which correspond to the Layer 2 of the OSI model, but is not limited thereto. It could advantageously be capable of supporting IPv4 and/or IPv6. The regional network 135 preferably supports Ethernet and/or IP and MPLS, and possibly other Layer 3 capable protocols. Furthermore, it should be noted that the access network 130 and the regional network 135 could be operated and/or managed by a single operator or by many different operators.

It is through a tight coupling of their traffic-engineering capabilities through the access edge node 160, that the access network 130 and the regional network 135 can provide end-to-end Quality of Service (QoS). The access edge node's role 160 is the creation, management and hosting of service agents 170 and service bindings (not shown in FIG. 2, but depicted on FIG. 4). Each of the service agents 170 corresponds to one of the service provider domains (140 or 150), and manages and controls therefor a VLAN over the access network 130. The expression "service binding" refers to a binding between the user domain 110 and one of the network service provider domain 140 or one of the application service provider domain 150. The access edge node and the concepts of service agents and service bindings will be described in further detail in the description referring to FIGS. 4, 5*a* and 5*b*.

Turning now to the user domains 110, the latter rely on the access domain 115 for handling end-to-end communication with the network service providers 140 and the application service providers 150. It should be noted that in the present description, use of the word "domain" refers to one or multiple network elements sharing similar functional features. Thus, in the context of the present invention, the expression "user domains" may refer to independent computers, local networks of computers connected through a router either physically or wirelessly, wireless phones, Personal Digital Assistants (PDAs), and all other devices that are capable of data communication over a data network such as network 200. Additionally, the expression "user domain" is intended to also include multiple simultaneous data traffic sessions performed with a multitude of devices, through one single user port. For example, a user could concurrently access different applications and network services such as Internet access, video conferencing, and television programs with one or multiple devices through a user domain located VLAN, or one single user port referred to herein as "user domain".

The network service providers 140 refer to entities that use the access domain 115 to provide IP addressing and connectivity to another IP network, and to offer and deliver specific application. In the context of data traffic with the user domains 110, the network service providers 140 typically own and assign IP addresses to the user domains 110, using an identification based on for example Remote Authentication Dial-In User Service (RADIUS). The network service providers 140 may further perform user-level authentication and authorization if desired and/or necessary.

The application service providers 150 use the access domain 115 to offer and deliver application to end-users of the user domains 110. Examples of such applications include gaming, video on demand, videoconferencing, and many other possible applications. It is however the access domain 115 that assigns IP addresses on behalf of the applications service providers to the user domains 110. If desired, the application service providers 150 can also perform authentication at the user-level and authorization if necessary. It should be noted that in the foregoing description, the expression "service providers" and "service providers domains" will be alternatively used to represent concurrently both network service providers 140 and application service providers 150, and the expression "service provider" represents one of the network service providers 140 or application service providers 150.

Figure 3:
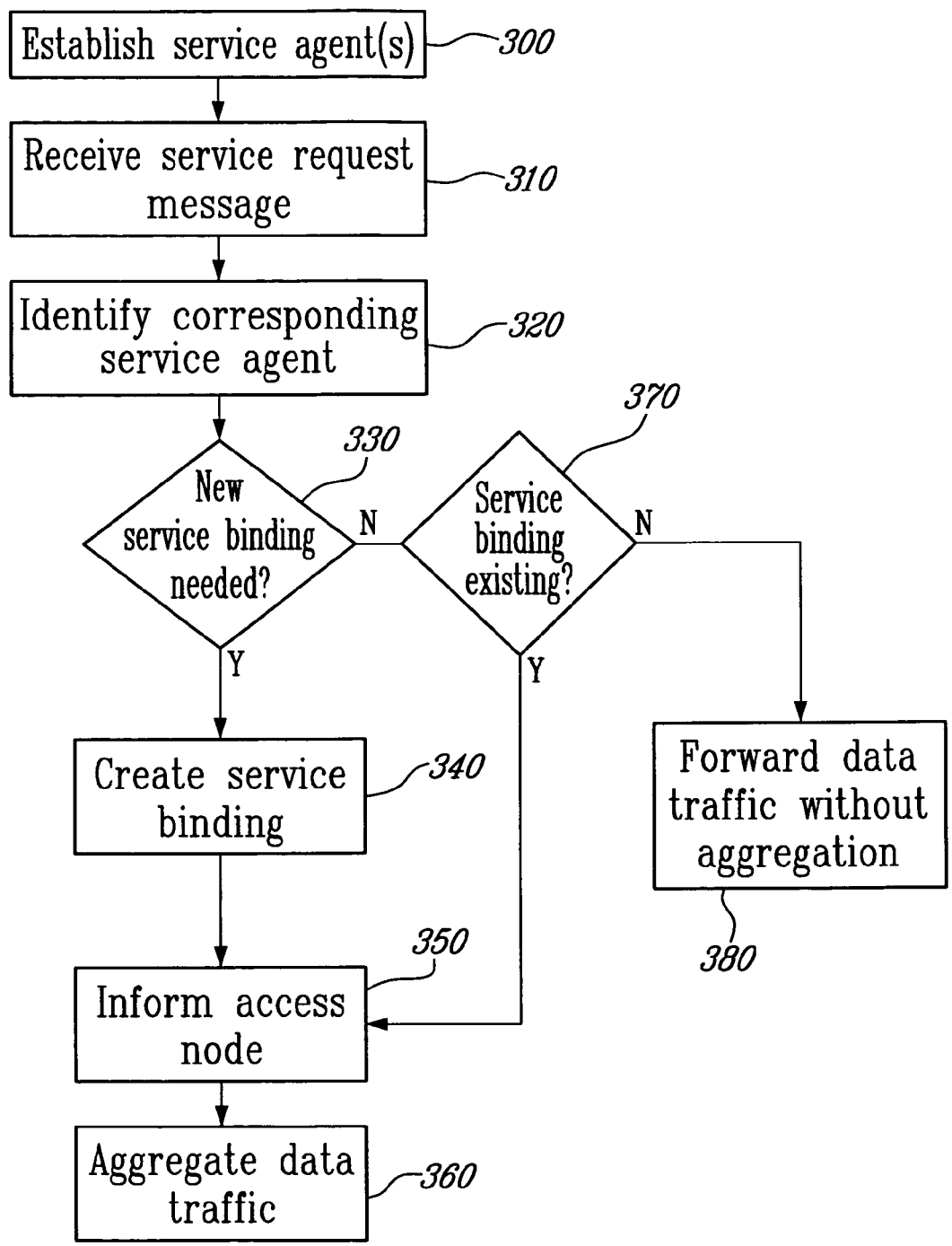
FIG. 3 is a simplified flowchart of a method for aggregating data traffic in accordance with the present invention.

Reference is now made to FIG. 3 that represents a simplified flowchart of a method for aggregating data traffic in accordance with the present invention. The present method performs data traffic aggregation over the access domain 115, which transports data traffic between a plurality of network service providers 140 and application service providers 150, and user domains 110. The method may optionally start with a step 300 for establishing a plurality of service agents over the access domain 115. However, it should be noted that the step 300 of establishing a plurality of service agents is not to be performed each time, but rather when an access edge node 160 is introduced in the access domain 115. Afterwards, the method starts at step 310 with the receiving of a service request related message at the access edge node 160. The service request related message identifies one of the service providers and one of the user domains. The service request related message may have been generated for example through accessing by the identified user domain of a web page of the identified service provider. The method pursues with a step 320 for identifying whether one of the established service agents corresponds to the identified service providers 140 or 150. Then, the method has a step 330 for determining whether a service binding is needed. If the determining step 330 is positive, the method pursues with a step 340 of creating a service binding for the received service request related message. The method pursues with step 350 of informing an access node 120 responsible for providing access to the user domain identified in the service request related message of the creation of the service binding. The access node 120 is thus informed that data traffic received from the user domain identified in the service request related message and addressed to the identified service provider is to be aggregated over the access domain in accordance with the created service binding. The method continues with step 360 which consists of aggregating data traffic to be transported over the access domain 115, received at the access node or the access edge node for the identified user domain and service provider, in accordance with the created service binding. In the event in step 330 that it is determined that a service binding is not needed, the method further proceeds with a step 370 for determining whether a service binding already exists for the received service request related message. In the event that the outcome of the determination step 370 is that a service binding already exists, the method pursues with step 350 of informing the access node 120 of the existing service binding. Alternatively, if the outcome of the determination step 370 is negative, the method continues at step 380 by forwarding data traffic corresponding to the received service request related message without aggregating it over the access domain 115.

As previously mentioned, a service binding relates to a transport relationship. That transport relationship is established between one of the user domains and one of the service providers, and directly impacts the serving access node 120 and one of the serving agents 170 of the access edge node 160. Conceptually speaking, the creation of a service binding corresponds to adding the identified user domain to the VLAN corresponding to the service provider domain over the access domain. Thus, each service binding represents a tradable business entity, which guarantees delivery of the corresponding service, with the right integrity and QoS, between a specific user port of the user domain and a specific provider port of the service provider. Service bindings are created, managed and hosted in the access edge node, and exist in combination with the service agents 170.

Since the service agents and service bindings are created, managed and hosted in the access edge node, reference is now made concurrently to FIGS. 2 and 4, where FIG. 4 is a schematic representation of an access edge node in accordance with the teachings of the present invention. To be able to perform the tasks of creation, management and hosting of the service agents and service bindings, the access edge node is composed of multiple elements. Because of its location in the access domain 115, the access edge node includes an input output unit including an access domain input/output unit 410 for communicating with the access network 130 of the access domain 115 and with access nodes 120. It is also the access domain input/output unit 410 that receives the service request related messages 420. The input/output unit of the access edge node 160 also includes a network/application service provider domains input/output unit 430 for communicating with the network service providers 140 and application service providers 150 over the regional network 135. Furthermore, the access edge node 160 includes a service agent unit 440, a controlling unit 450, and may further include a translation table 460, a forwarding unit 470 and a regulating unit 480.

The service agent unit 440 is composed of a service agents management and control unit 442 and a service bindings hosting unit 444. The service agent unit 440 keeps existing service agents' 170 information in the service agents' management and control unit 442. The service agents' management and control unit 442 in turn is responsible for the creation and management of the service bindings 446. For doing so, the service agents management and control unit 442 determines when new service bindings 446 are required or can be removed, and proceeds with the creation/removal of service bindings 446. The service agents' management and control unit 442 is also responsible for the adding/removal of user devices to existing service bindings. Furthermore, the service agents management and control unit 442 is responsible for ensuring synchronicity of service bindings 446 related information with access nodes with which it is interacting. The service agents' management and control unit 442 is also responsible for the creation of Multi Protocol Label Switching (MPLS) reserved paths in the access network 130, when such a reserved path is required. The description accompanying FIGS. 7 and 8 will provide an exhaustive explanation of the various messages used by the service agents' management and control unit 442 to perform its various responsibilities.

Reference to FIG. 5a, which represents an exemplary tabular representation of the content of the service agents' management and control unit 442, is now concurrently made with FIG. 4. Each of the rows of FIG. 5a, at the exception of the first row, which is a header row, represents exemplary content of some of the service agents 170 managed and controlled by the service agents management and control unit 442. Each of the columns of FIG. 5a corresponds to specific information, maintained by the service agents' management and control unit 442, for each of the service agents 170. The first column represents an identification of the service agent 170. That identification is typically a number or a service agent identifier corresponding to the service agent. In accordance to a preferred embodiment of the invention, each service agent in the access edge node has a unique service agent identifier, and corresponds to one specific service provider domain 140 or 150. The second column refers to an identification of a specific service type for the corresponding service agent. For example, in cases where one service provider domain 140 or 150 offers multiple services, each of the services offered is associated with a different service type so as to differentiate between the various services of a service provider domain. The third column identifies the preferred or necessary Quality of Service (QoS) required for properly transporting data traffic for that service provider domain and the related service type. Exemplary criteria for QoS may include delay, bit error rate, bandwidth, and preferred protocol. The fourth column indicates a port to be used in the regional network to communicate with the corresponding service provider domain. In addition to this content, the service agents' management and control unit 442 includes sufficient logical software and hardware to create additional service agents and remove unnecessary service agents. It should be noted as well that even though the content of the service agents' management and control unit has been represented in FIG. 5a in the form of a table, such content is not limited thereto. The service agents' management and control unit could be composed of a relational database, hard coded components, microprocessors, programming library, etc. . . .

Reference is now made to FIG. 5b, which represents an exemplary tabular representation of the content of the service bindings hosting unit 444, concurrently with FIG. 4. Each of the rows of FIG. 5b, at the exception of the header row, represents exemplary content of some of the service bindings 446 hosted in the service bindings hosting unit 444. Each of the columns of FIG. 5b corresponds to specific information, hosted in the service bindings hosting unit 444, for each of the service bindings 446. The first column represents an identification of a corresponding service agent, by using for example the service agent identifier of the service agent. The second column identifies the service type, as described in relation with FIG. 5a. The other columns represent the transport primitives for data traffic related to the service binding. More specifically, the third second column identifies a user domain Media Access Control (MAC) address. The fourth column consists of an identification of a port used by the user domain on the serving access node. The fifth column corresponds to the local network arbitrary identifier used by the user domain, and may include for example implicit or explicit VLAN information. The sixth column refers to a virtual MAC address of the access node serving the user domain. Hence, each service binding 446 binds together one of the service agents, one of the user domains and one of the access nodes for providing data traffic between one user domain and one service provider domain 140 or 150. It should be noted that even though the content of the service bindings hosting unit 444 has been represented in FIG. 5b in the form of a table, such content is not limited thereto. The service bindings hosting unit could be composed of a relational database, hard coded components, microprocessors, programming library, etc. . . .

Furthermore, the service bindings hosting unit may further contain a seventh column which includes an IP address uniquely identifying the user domain or a user device thereof. That unique IP address could be provided to the user domain or user device by the access edge node through a protocol such as Dynamic Host Configuration Protocol (DHCP), using for example Broadcast mechanism that could be performed prior to the service request message. The combination of the service agent identifier and the user domain or user device unique IP address thus represents a simple and reliable way of quickly relating incoming messages to the proper service binding. Typically, once the service binding has been created, the access node has been informed thereof, and the data traffic is being aggregated over the access domain in accordance with the service binding, the aggregated data traffic received at the access edge node is disaggregated prior to its forwarding to the corresponding service provider domain using the information provided in the service bindings hosting unit. More particularly, in the case where the access domain is an Ethernet network, the service agent identifier is provided, for example, in the field known as the VLAN Tag of Unicast, Multicast and Broadcast messages, while the user domain or user device IP address is provided in IP messages embedded in the Ethernet messages. Based on the service agent identifier provided in the VLAN Tag field of Ethernet message, and on the IP address provided in the embedded IP message, the service agent unit 440 can disaggregate the data traffic and ensures its forwarding to the corresponding service provider domain, and inclusion of necessary information on the sending user domain, such as user MAC info and its local network context.

Returning now to the description of FIG. 4, the controlling unit 450 of the access edge node is responsible for determining, upon receipt of the service request related message 420, whether it corresponds to one of the service agents. For doing so, the controlling unit 450 consults the service agents' management and control unit 442 to determine whether one of the service agents 170 corresponds to the service provider domain identified in the service request related message 420. In the event that one of the service agents 170 corresponds thereto, the controlling unit 450 instructs the service agents' management and control unit 442 to create a service binding 446 for the received service request related message. The creation of a service binding 446 for the received service request related message 420 includes adding an entry in the service bindings hosting unit 444, in which:

the service agent ID (first column) corresponds to the service agent identifier for the service agent corresponding to the requested service provider domain;
the user MAC info is the user device MAC address;
the user port on access node is an identification of the port on the serving access node with which the user device is connected;
the local network context corresponds to an arbitrary identifier provided in a field labelled "VLAN tag" of Ethernet messages to be received from the user device and corresponding a local user domain identifier; and
the access node MAC is a virtual MAC address for the access node serving the user device for which the service request related message was received.

Then, the controlling unit 450 informs the access node serving the user domain identified in the service request related message, through a service binding related message 490 sent by the access domain input/output unit 410, of the creation of the service binding 446. In the event that a service binding already exists for the service request related message 420, the controlling unit 450 informs the serving access node of the existing service binding through a service binding related message 490.

The controlling unit 450 also interacts with the translation table 460. Since each service agent 170 of the service agents' management and control unit is uniquely identified by a service agent identifier, it is necessary to keep in the translation table a mapping between the service agent identifier corresponding to service agents 170 and corresponding service provider domains (140 or 150). Thus, upon receipt of data traffic at the access domain input/output unit 410 having a destination address corresponding to a virtual MAC address for the access edge node 160 and a VLAN tag corresponding to one of the service agent identifier, the controlling unit 450 consults the translation table 460 to obtain a fast translation of the access edge node virtual MAC address to the destination service provider domain (140 or 150) address corresponding to the service agent identifier provided in the VLAN tag.

The controlling unit 450 further consults with the forwarding unit 470, to determine whether received data traffic at the access domain input/output unit 410 is to be directly forwarded to the service provider domains input/output unit without any modification.

Finally, the controlling unit 450 can also interact with a regulating unit 480, which can perform, on received data traffic at either the access domain input/output unit 410 and the network/application service providers domain input/output unit 430, downstream/upstream traffic policing and marking, traffic remarking, as indicated and/or required by corresponding service agents 170.

Figure 6:
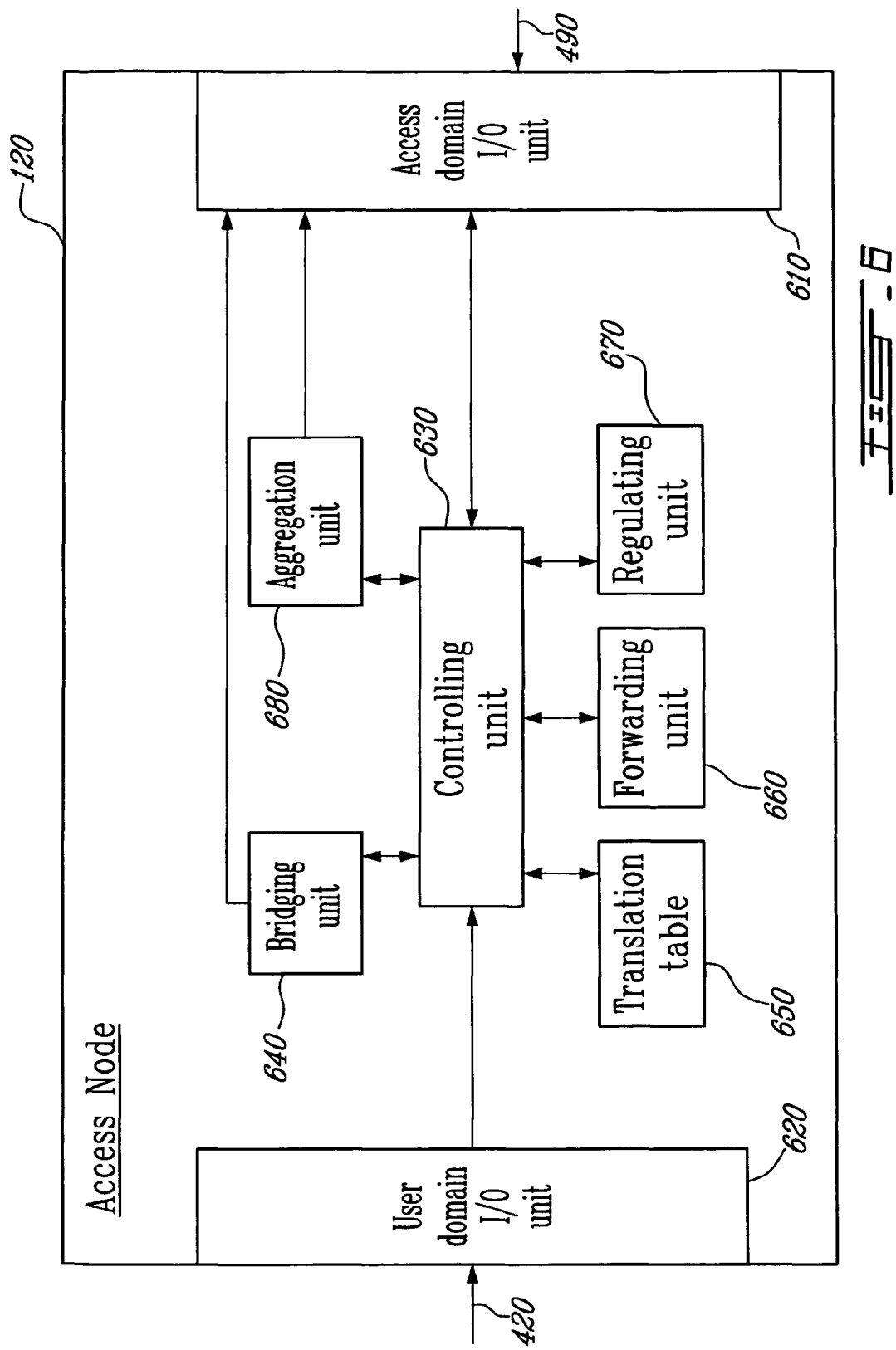
FIG. 6 is a schematic representation of an access node in accordance with the teachings of the present invention.

Reference is now made to FIG. 6, which is a schematic representation of one of the access nodes in accordance with the teachings of the present invention. Because of its location in the access domain 115, the access node 120 includes an access domain input/output unit 610 for communicating with the access network 130 of the access domain 115 and with the access edge node 160. The access node 120 also includes a user domains input/output unit 620 for communicating with the user domains 110. A type of messages received at the access domain input/output unit 610 are the service binding related messages 490. The service binding related messages 490 are generated by the access edge node 160, and sent over the access network 130. Examples of service binding messages 490 will be provided in the description of FIGS. 7 and 8.

The access node 120 is capable of receiving and handling multiple service binding related messages 490. The service binding related messages 490 are received at the access node 120 from the access network 130, through the access domain input/output unit 610. Upon receipt of a service binding related message 490, the access domain input/output unit forwards the received service binding related message 490 to the controlling unit 630. The controlling unit 630 extracts the contact of the service binding related message 490, and determines whether there are actions to be taken. An example of service binding related message 490 is the information about the creation of a new service binding. As previously described, when the access edge node 160 determines that a new service binding is required, it proceeds with its creation and informs the access node serving the requesting user domain of the creation of the service binding. The service bindings related message 490 used in this particular instance is called ADD_SB (add service binding). The ADD_SB message is sent from the access edge node 160 to the access node 120, and contains information on the created service binding.

The information contained in the ADD_SB message must then be incorporated into an aggregation unit 680 of the access node 120.

One of the various responsibilities of the aggregation unit 680 is the hosting of service bindings related information. Service bindings related information contains specific service binding information (in the form of service agent identity and service type), identification on a port of the access node which received the service request related message, and local network context of the user domain.

The access node 120 further handles incoming data traffic originating from/destined to user domains to which it provides access service to the access network 130. For doing so, the access node 120 further contains a translation table 650, a forwarding unit 660, a regulating unit 670 and an aggregation unit 680. For doing so, data traffic received at the access node 120 by either the user domain input/output unit 620 or the access domain input/output unit 610 is forwarded to the controlling unit 630. The controlling unit 630 interacts with the translation table 650. Since each service binding stored in the service bindings hosting unit 444 of the service agent unit 440 is identified by a combination of parameters (service agent identity, service type, user device MAC address and access node virtual MAC address), it is necessary to keep in the translation table 650 a mapping between the service agent identity corresponding to service agents 170 and corresponding service provider domains (140 or 150). Thus, upon receipt of data traffic at the access domain input/output unit 610 having a destination address corresponding to the virtual MAC address of the access node 120, the controlling unit 630 consults the translation table 650 to obtain a fast translation of the destination address and VLAN tag so as to correspond respectively to the user domain MAC address and the local identifier. Such translation is required, because the user domain information is not carried over the access domain between the access edge node 160 and the access node 120. The present invention thus allows to seamlessly aggregate data traffic over the access domain from the user domain point of view.

The controlling unit 630 further consults with the forwarding unit 660, to determine whether received data traffic at the access domain input/output unit 610 or at the user domain input/output unit 620 is to be directly forwarded to the corresponding user domain 110 or the access network 130 without any modification.

Finally, the controlling unit 630 can also interact with a regulating unit 670. Interaction with the regulating unit 670 is required, for example, when downstream/upstream traffic policing and marking, traffic remarking, is necessary, as indicated in the properties of the service binding.

Figure 7:
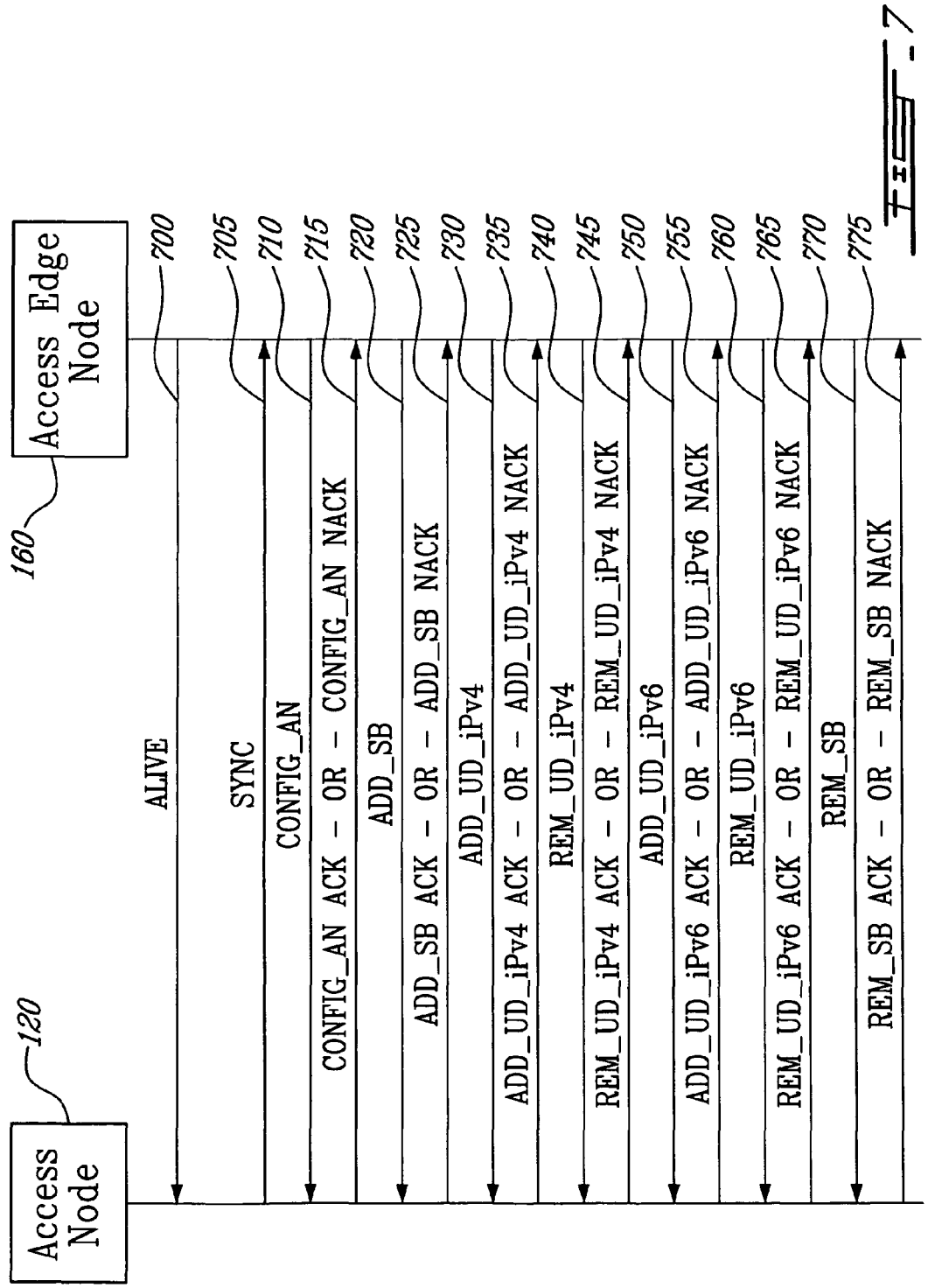
FIG. 7 is a flow diagram representing exemplary messages exchanged between the access nodes and the access edge node in accordance with the teachings of the present invention.

Reference is now made to FIG. 7, which represents a flow diagram of some messages exchanged between the access nodes 120 and the access edge node 160. Those messages carry information about management and traffic operations there between. It should be understood that the messages depicted in FIG. 7 should not be read as sequential, but rather as a list of examples of possible messages for exchange of information between each of the access nodes 120 and the access edge node 160. The messages exchanged on FIG. 7 have also been alternatively called "service bindings related messages 490" throughout above description. The list of messages depicted on FIG. 7 should not be read as an exhaustive and complete list of message being exchanged between the access nodes 120 and the access edge node 160, but rather as exemplary messages.

The first message depicted on FIG. 7 is called ALIVE message 700. It is sent from the access edge node 160 to one of the access nodes 120, to inform the latter that it is currently considered not alive by the access edge node 160. For the access node 120 receiving the ALIVE message 700, it triggers the sending of a SYNC message 705 to the access edge node 160. The SYNC message 705 can be used to indicate that the local configuration stored in the aggregation unit 680 stored at sending access node 120 is lost or outdated. The SYNC message 705 indicates to the access edge node 160 that it needs to rebuild the configuration of the sending access node 120. The SYNC message 705 will typically be followed by a CONFIG_AN message 710, which includes information needed at the receiving access node 120 to rebuild its local configuration. To confirm that the CONFIG_AN message 710 was properly or improperly received, it is followed by a CONFIG_AN ACK (acknowledgement) or CONFIG_AN NACK (no acknowledgement) message 715.

Referring still to FIG. 7, another type of messages that are exchanged between the access nodes 120 and the access edge node 160 are ADD_SB message 720. That message allows the access edge node 160 to inform the receiving access node 120 of adding a new service binding to its local configuration, or of updating an existing service binding. The ADD_SB message 720 is followed by an ADD_SB ACK (acknowledgement) or ADD_SB NACK (no acknowledgement) message 725.

Another type of message exchanged relates specifically to service bindings for IPv4. The message ADD_UD_IPV4 730 informs the receiving access node 120 to add or update a user device to an existing service binding for IPv4. That message is followed by an ADD_UD_IPv4 ACK (acknowledgement) or an ADD_UD_IPv4_NACK (no acknowledgement) message 735. Another message generated by the access edge node 160 and relating to IPv4 service bindings is the REM_UD_IPv4 message 740. The REM_UD_IPv4 message 740 allows the access edge node 160 to inform the receiving access node 120 to remove a user device to an existing service binding for IPv4. As with the previous messages, the REM_UD_IPv4 message 740 is followed by response message from the access node 120 in the form of a REM_UD_IPv4 ACK or NACK message 745.

Similar to the messages for service bindings for IPv4, a set of message for service bindings for IPv6 are provided. The message ADD_UD_IPv6 750 informs the receiving access node 120 to add or update a user device to an existing service binding for IPv6. That message is followed by an ADD_UD_IPv6 ACK (acknowledgement) or an ADD_UD_IPv6_NACK (no acknowledgement) message 755. Another message generated by the access edge node 160 and relating to IPv6 service bindings is the REM_UD_IPv6 message 760. The REM_UD_IPv6 message 760 allows the access edge node 160 to inform the receiving access node 120 to remove a user device to an existing service binding for IPv6. As with the previous REM_UD_IPv4 message 740, the REM_UD_IPv6 message 760 is followed by response message from the access node 120 in the form of a REM_UD_IPv6 ACK or NACK message 765.

Another type of message that is sent from the access edge node 160 to the access node is the REM_SB message 770, which indicates to the access node 120 to the remove from its local configuration the service binding identified in the message. Upon completion of the removal of the service binding at the access node 120, a REM_SB_ACK or REM_SB_NACK message 775 is sent from the access node to the access edge node 160 to confirm completion or indicate improper completion of the removal of the indicated service binding from its local configuration.

Upon receipt of the various above listed messages from the access edge node 160, it is expected that the receiving access node 120 performs necessary update to its local configuration so as to be in synchronization with the active service bindings.

Figure 8:
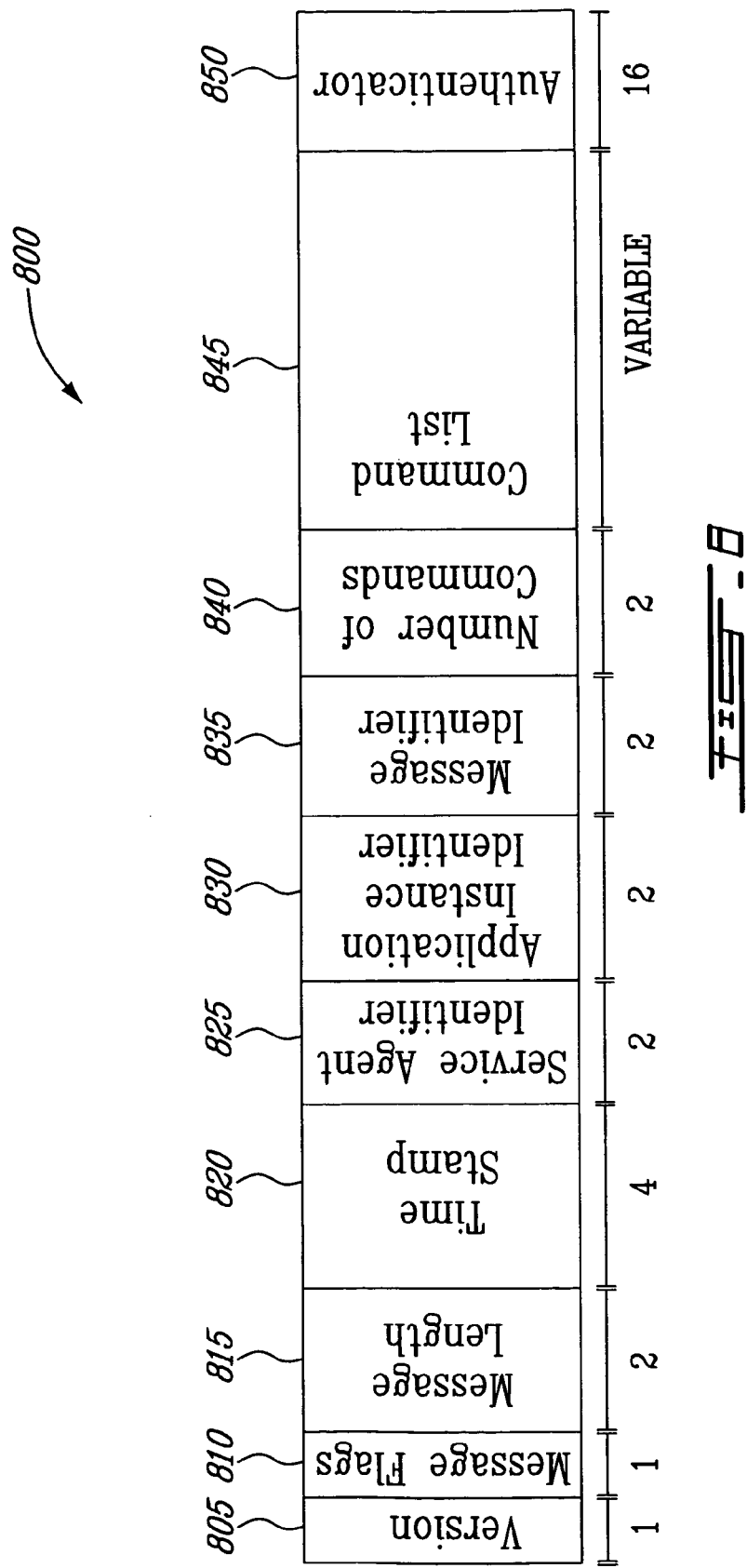
FIG. 8 is a table representing various fields of the messages exchanged between the access nodes and the access edge node in accordance with the teachings of the present invention.

Turning now to FIG. 8, there is depicted a table representing fields of the messages of FIG. 7. The format 800 of the messages includes the fields written in the boxes, and the corresponding number of bytes indicated underneath. The first field is the version field 805. The version field indicates the version of a protocol used in the message. The corresponding answer message should preferably be send using the same version of the protocol. The second field is the Message Flags field 810. One possible use of that field is to indicate using bit 0 of the byte that a 1 indicates the message is a request, while a 0 indicates the message is an answer. The third field is Message Length field 815, which indicates the total length of the message, which is composed of all the fields herein defined, at the exception of an authenticator field 850. The following field is the Time Stamp 820. The Time Stamp field 820 is used to indicate the time the message was sent. It uses the Coordinated Universal Time, with a precision defined in seconds. The Service Agent Identifier 825 field specifies the identity of the service. The Application Instance Identifier 830 within the Service Agent specifies uniquely an application instance per service binding. The Message Identifier field 835 is used by requesters to correlate answer messages with their corresponding request messages. Following is the Number of Commands field 840, which is used to indicate the number of commands specified in the command list. The Command List field 845 represents a list of commands. Each command has preferably the following format: 2 bytes for a Command Type, 2 bytes for a Command Data Length and a variable number of bytes for Command Data. The following table provides additional information on possible Command Types, Command Data Length and Command Data. Finally, the Authenticator field 850 is used to authenticate the message.

| Message Type | Requester | Command Type | Command Data Length | Command Data |
|---|---|---|---|---|
| Answer | AN/AEN | 1 (ACK) | 0 | — |
| Answer | AN/AEN | 2 (NACK) | 2 | Command Index |
| | | | 2 | Error Code |
| Request | AN | 10 (SYNC) | 4 | Synchronization Time |
| Request | AEN | 12 (ALIVE) | 4 | Alive time |
| Request | AN/AEN | 13 (Heartbeat) | 0 | — |
| Request | AEN | 20 (ADD_PROFILE) | 2 | Rate-limiting profile identifier |
| | | | 1 | Rate-limiting protocol |
| | | | 1 | Unused |
| | | | 4 | CIR |
| | | | 4 | PIR |
| | | | 2 | CBS |
| | | | 2 | EBS/PBS |
| Request | AEN | 21 (REM_PROFILE) | 2 | Rate-limiting profile identifier |
| | | | 2 | Unused |
| Request | AEN | 30 (CONFIG_AN) | 2 | Access node identifier |
| | | | 6 | AEN broadcast handler MAC address |
| | | | 2 | Default Service Agent |
| | | | 2 | Unused |
| Request | AEN | 40 (ADD_SB) | 2 | User port |
| | | | 2 | Service Identifier |
| | | | 2 | Rate-limiting profile identifier |
| | | | 1 | Priority |
| | | | 1 | Unused |
| Request | AEN | 41 (REM_SB) | 2 | User port |
| | | | 2 | Service identifier |
| Request | AEN | 42 (ADD_AUTH_MAC) | 6 | User device MAC address |
| | | | 2 | Service identifier |
| | | | 2 | User port |
| | | | 10 | Termination state |
| | | | 1 | User Name Length |
| | | | Variable | User name |
| Request | AEN | 44 (ADD_AUTH_SB) | 2 | Service identifier |
| | | | 6 | Authorize MAC address |
| | | | 2 | Rate-limiting profile identifier |
| | | | 1 | Priority |
| | | | 1 | Unused |
| Request | AEN | 45 (REM_AUTH_SB) | 2 | Service identifier |
| | | | 6 | Authorize MAC address |
| Request | AEN | 50 (ADD_UD_Ipv4) | 2 | User port |
| | | | 2 | Service identifier |
| | | | 4 | User-device Ipv4 address |
| | | | 6 | User-device MAC address |
| | | | 2 | Unused |

-continued

| Message Type | Requester | Command Type | Command Data Length | Command Data |
|---|---|---|---|---|
| Request | AEN | 51 (REM_UD_IPv4) | 2 | User port |
| | | | 2 | Service identifier |
| | | | 4 | User-device Ipv4 address |
| | | | 6 | User-device MAC address |
| | | | 2 | Unused |
| Request | AEN | 60 (ADD_UD_IPv6) | 2 | User port |
| | | | 2 | Service identifier |
| | | | 16 | User-device Ipv6 address |
| | | | 6 | User-device MAC address |
| | | | 2 | Unused |
| Request | AEN | 61 (REM_UD_IPv6) | 2 | User port |
| | | | 2 | Service identifier |
| | | | 16 | User-device Ipv6 address |
| | | | 6 | User-device MAC address |
| | | | 2 | Unused |
| Request | AEN | 70 (JOIN_IPv4) | 4 | Multicast IPv4 address |
| | | | 2 | User port |
| | | | 2 | Service identifier |
| Request | AEN | 71 (LEAVE_Ipv4) | 4 | Multicast IPv4 address |
| | | | 2 | User port |
| | | | 2 | Service identifier |
| Request | AEN | 72 (JOIN_AUTH_Ipv4) | 4 | Multicast Ipv4 address |
| | | | 6 | User device MAC address |
| | | | 2 | Service identifier |
| Request | AEN | 73 (LEAVE)AUTH_Ipv4) | 4 | Multicast Ipv4 address |
| | | | 6 | User device MAC address |
| | | | 2 | Service identifier |
| Request | AEN | 80 (JOIN_Ipv6) | 16 | Multicast IPv6 address |
| | | | 2 | User port |
| | | | 2 | Service identifier |
| Request | AEN | 81 (LEAVE_Ipv6) | 16 | Multicast IPv6 address |
| | | | 2 | User port |
| | | | 2 | Service identifier |
| Request | AEN | 82 (JOIN_AUTH_Ipv6) | 16 | Multicast Ipv6 address |
| | | | 6 | User device MAC address |
| | | | 2 | Service identifier |
| Request | AEN | 83 (LEAVE_AUTH_Ipv6) | 16 | Multicast Ipv6 address |
| | | | 6 | User device MAC address |
| | | | 2 | Service identifier |
| Request | AEN | 100(SND_ETH_U) | 2 | User port |
| | | | 2 | Unused |
| | | | Variable | Ethernet frame |
| Request | AEN | 101 (SND_EHT_D) | Variable | Ethernet frame |
| Request | AEN | 102 (SND_AND) | Variable | Ethernet frame |
| Request | AEN | 103 (SND_UND) | 2 | User port |
| | | | 2 | Unused |
| | | | Variable | Ethernet frame |

To facilitate understanding of the above table, the following list of acronyms and their definitions is provided:

| | |
|---|---|
| AEN: | access edge node |
| ACK: | acknowledgment |
| ADD_AUTH_MAC: | Add/update an authorize MAC |
| ADD_AUTH_SB: | Add/update an authenticated service binding |
| ADD_PROFILE: | Add/update a rate limiting profile |
| ADD_SB: | Add/update a service binding |
| ADD_UD_IPv4: | Add/update a user device to an existing service binding for IPv4 |
| ADD_UD_IPv6: | Add/update a user device to an existing service binding for IPv6 |
| AN: | access node |
| CBS: | Committed Burst Size |
| CIR: | Committed Information Rate |
| CONFIG_AN: | Configure Access Node |
| EBS: | Excess Burst Size |
| JOIN_AUTH_IPv4: | Join/re-join IPv4 multicast group for authenticated user device. |
| JOIN_AUTH_IPv6: | Join/re-join IPv6 multicast group for authenticated user device |
| JOIN_IPv4: | Join/re-join IPv4 multicast group |
| JOIN_IPv6: | Join/re-join IPv6 multicast group |
| LEAVE_AUTH_IPv4: | Leave IPv4 multicast group for authenticated user device |
| LEAVE_AUTH_IPv6: | Leave IPv6 multicast group for authenticated user device |
| LEAVE_IPv4: | Leave IPv4 multicast group |
| LEAVE_IPv6: | Leave IPv6 multicast group |
| MAC address: | Media Access Control address |
| PBS: | Peak Burst Size |

-continued

| | |
|---|---|
| PIR: | Peak Information Rate |
| REM_AUTH_SB: | Remove an authenticated service binding. |
| REM_PROFILE: | Remove a rate-limiting profile |
| REM_SB: | Remove a service binding |
| REM_UD_IPv4: | Remove a user device from an existing service binding for IPv4 |
| REM_UD_IPv6: | Remove a user device from an existing service binding for IPv6 |
| SND_AND: | Send frame on Access Network Domain |
| SND_ETH_D: | Send frame downstream |
| SND_ETH_U: | Send frame upstream |
| SND_UND: | Send frame on the specified user port toward the User Domain. |

Although several preferred embodiments of the method and nodes of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An access edge node for aggregating data traffic over an access domain, the access domain carrying data traffic between user domains and service provider domains, the access edge node comprising:
    a service agent unit, having a processor for executing non-transitory instructions, for hosting service agents, each of the service agents corresponding to one of the service provider domains, and maintaining and controlling a Virtual Local Area Network per service provider domain over the access domain;
    a service bindings unit, having a processor for executing non-transitory instructions, for hosting existing service bindings information, each of the service bindings information including identity of one of the service agents, user domain information and access domain transport primitives;
    an input/output for communicating with the service provider domains, with the access domain and with access nodes providing access to the access domain to the user domains, the input/output further receiving service request related messages, the service request related message identifying one of the service provider domains and one of the user domains; and
    a controller for determining, upon receipt of a service request related message at the input/output, whether one of the service agents correspond to the service provider domains identified therein, and if so, creating a corresponding service binding in the service bindings unit and informing an access node serving the user domain identified in the service request message to send data traffic related to the received service request in accordance with the created service binding.

2. An access edge node in accordance with claim 1, wherein the creating of a corresponding service binding in the service bindings unit corresponds to:
    adding the user domain to the VLAN corresponding to the requested service provider by adding in the service bindings unit an entry with the identity of the service agents corresponding to the requested service provider, user domain information and access domain transport primitives therebetween.

3. The access edge node of claim 2, wherein the input/output further comprises:
    a service provider domains input/output for communicating with the service provider domains; and
    an access domain input/output for communicating with the access domain and with access nodes providing access to the access domain to the user domains, the access domain input/output further receiving the service request related messages from the service provider domains, the service request related message identifying one of the service provider domains and one of the user domains.

4. An access edge node in accordance with claim 2, wherein the access domain transport primitives of each of the service bindings includes at least one a user domain Medium Access Control (MAC) address, a user domain local network context, and a virtual access node MAC address.

5. An access edge node in accordance with claim 2, wherein some of the service bindings are Ethernet Unicast service bindings.

6. An access edge node in accordance with claim 2, wherein some of the service bindings are Ethernet multicast service bindings.

7. An access edge node in accordance with claim 2, wherein the service bindings unit hosts multiple service bindings for one user domain.

8. A method for performing aggregation of data traffic over an access domain, the access domain carrying data traffic between a plurality of service providers domains and user domains, the method comprising steps of:
    establishing a plurality of service agents in an access edge node, each of the service agents corresponding to one of the service provider domains, and maintaining and controlling a Virtual Local Area Network per service provider domain over the access domain;
    upon reception at the access edge node of a service request related message, the service request related message identifying one of the service provider domains and one of the user domains, determining whether one of the established service agents corresponds to the required service provider domain, and if one of the established service agents corresponds to the identified service provider domain:
    creating at the access edge node a service binding for the received service request related message, the service binding including identity of the corresponding service agent, identified user domain information and access domain transport primitives;
    informing an access node responsible for providing access to the identified user domains to the access domain of the creating of the service binding; and
    aggregating data traffic between the identified user domain and the identified service provider in accordance with the created service binding.

9. The method of step 8, wherein the step of creating a service binding corresponds to adding the user domain to the VLAN corresponding to the requested service provider.

10. The method of step 9, wherein the access domain transport primitives of each of the service bindings includes at least one user domain Medium Access Control (MAC) address, a user domain local network context, and a virtual access node MAC address.

11. The method in accordance with claim 9, wherein some of the service bindings are Ethernet unicast service bindings.

12. The method in accordance with claim 10, wherein one of the existing VLAN corresponds to a MultiProtocol Label Switching reserved path.

13. An access node for aggregating data traffic over an access domain, the access domain carrying data traffic between user domains and service provider domains, the access node comprising:
- an input/output for receiving data traffic from the user domains and for forwarding data traffic received from the user domains over the access domain;
- an aggregator that stores information on existing service bindings over the access domain, the information including for each service binding an identification of the service binding, identity of a user domain, with an identity of a Virtual Local Area Network (VLAN) over the access domain corresponding to a service provider domain, wherein the access node maintains and controls a VLAN per service provider domain; and
- a controller for determining, upon receipt of data traffic from one of the user domains whether that data traffic corresponds to one of the existing service bindings by comparing user domain identity in the aggregator, and if the user domain identity correspond to one of the existing service binding, informing the input/output to aggregate that received data traffic over the access domain in accordance with the corresponding service binding.

14. An access node in accordance with claim 13, wherein some of the service bindings corresponds to Ethernet unicast service bindings.

15. An access node in accordance with claim 13, wherein the input/output further comprises:
- a user domains input/output for receiving data traffic from the user domains; and
- an access domain input/output for forwarding data traffic received from the user domains over the access domain.

16. An access node in accordance with claim 15, wherein the access domain input/output is an Ethernet-based input/output.

17. An access node in accordance with claim 15, wherein the access domain input/output is an IP network input/output.

18. An access node in accordance with claim 14, wherein at least one of the Virtual Local Area Network corresponds to a MultiProtocol Label Switching reserved path.

* * * * *